United States Patent [19]
Lehrke et al.

[11] Patent Number: 6,164,560
[45] Date of Patent: Dec. 26, 2000

[54] LAWN APPLICATOR MODULE AND CONTROL SYSTEM THEREFOR

[75] Inventors: Kenneth Eugene Lehrke; Frederick Allan Powers, both of Maple Grove; Timothy Lynn Sebion, Lakeville; Gary Dean Ingle, Sr., Mound, all of Minn.

[73] Assignee: Wanner Engineering, Inc., Minneapolis, Minn.

[21] Appl. No.: 09/025,523

[22] Filed: Feb. 18, 1998

[51] Int. Cl.[7] .............................. A01G 25/09; B05B 9/00
[52] U.S. Cl. ........................ 239/172; 239/67; 239/127; 239/142; 239/175; 239/195; 239/304; 239/332; 307/9.1; 137/355.12; 137/355.17
[58] Field of Search ..................... 239/172, 175, 239/195–197, 124, 127, 142, 144, 67, 304, 526, 332, 339, 532, 289, 525, 527, 530, 305; 307/9.1; 137/355.12, 355.16, 355.17

[56] References Cited

U.S. PATENT DOCUMENTS

| | | |
|---|---|---|
| 2,367,135 | 1/1945 | Moon et al. ............................ 239/175 |
| 3,770,060 | 11/1973 | Forsyth et al. ....................... 239/172 X |
| 3,831,849 | 8/1974 | Studinger ............................. 239/172 X |
| 3,910,497 | 10/1975 | Manor ................................. 239/175 X |
| 4,236,673 | 12/1980 | Lake ....................................... 239/172 |
| 4,593,855 | 6/1986 | Forsyth ............................... 239/175 X |
| 4,609,149 | 9/1986 | Jessen ................................. 239/527 X |
| 4,821,958 | 4/1989 | Shaffer ............................... 239/172 X |
| 5,100,058 | 3/1992 | Wei ..................................... 239/526 X |
| 5,180,108 | 1/1993 | Miyamoto ............................... 239/172 |
| 5,303,866 | 4/1994 | Hawks, Jr. ........................... 239/127 X |
| 5,383,605 | 1/1995 | Teague ..................................... 239/526 |
| 5,636,648 | 6/1997 | O'Brien et al. ..................... 239/197 X |

OTHER PUBLICATIONS

Motorola Analog IC Device Data; Advance Information Brushless DC Motor Controller; MC 33035.

*Primary Examiner*—Andres Kashnikow
*Assistant Examiner*—Steven J. Ganey
*Attorney, Agent, or Firm*—Merchant & Gould P.C.

[57] ABSTRACT

A lawn care applicator system which is used on a vehicle having a vehicle electrical power system. The lawn care applicator system is specifically designed to be easy to use by an operator and to minimize electrical current usage, thereby allowing use of the applicator system with standard vehicle electrical power systems. The applicator system includes an applicator module that is removably mountable on the vehicle. The applicator module preferably includes a housing, at least one liquid supply tank disposed in the housing, and a liquid dispensing system disposed in the housing and connected to the liquid supply tank for dispensing liquid from the liquid supply tank and onto a lawn. A control system is electrically connected to the applicator module for providing power to, and controlling the operation of, the applicator module. The control system is adapted to be connected to the vehicle electrical power system to provide electrical power for the applicator system. Since power is provided by the vehicle electrical power system, the use of separate gas engines, electrical generators, and PTO drives to power the applicator module are eliminated.

57 Claims, 11 Drawing Sheets

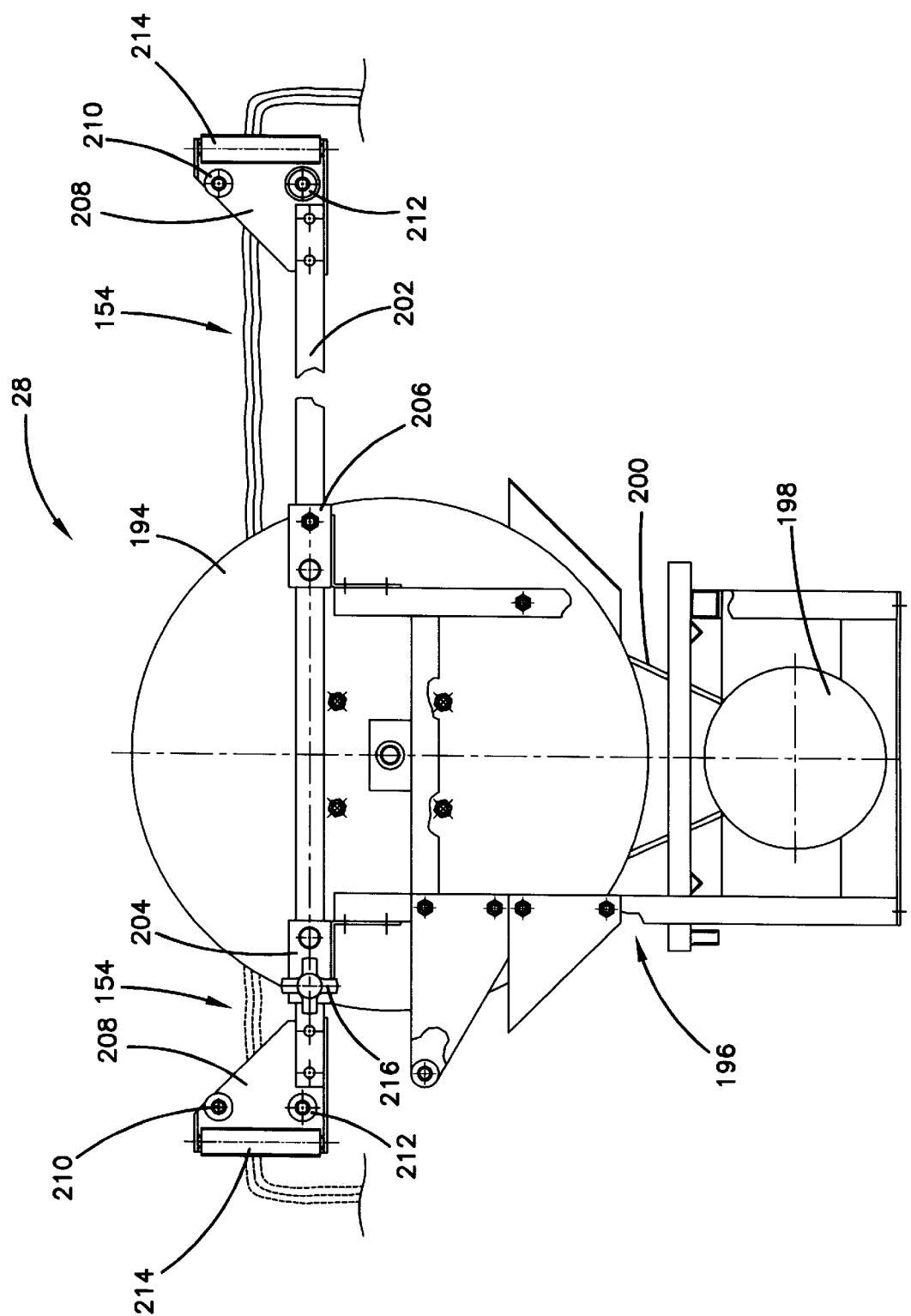

6,164,560

LAWN APPLICATOR MODULE AND CONTROL SYSTEM THEREFOR

FIELD OF THE INVENTION

This invention relates to the application of lawn care fluids to lawns, and more particularly to a lawn applicator module that is removably installed in a pickup truck box or the like and which is used to apply lawn care fluids to lawns, and to a control system for controlling the operation of the lawn applicator module.

BACKGROUND OF THE INVENTION

The lawn care industry typically utilizes vehicles, such as pick-up trucks, to transport lawn care fluids, i.e. specially formulated fertilizers and herbicides, to a lawn which is to be sprayed with one or more of the fluids. Each vehicle is generally equipped with a tank for holding each lawn care fluid and means for dispensing the liquid from each tank for applying the lawn care fluids to lawns. Current systems typically use gas engine driven pumps for pumping the lawn care fluids. However, these gas engine driven pumps are noisy and create a relatively large amount of pollution, which is a particular problem in residential neighborhoods in which lawn care vehicles often operate. In addition, gas engine driven pumps create gasoline handling and hauling hazards, in addition to reliability and lifetime hazards. Some larger trucks use PTO drives to power the pumps, however PTO drives have associated complex valving and fluid sealing problems.

Further, on most lawn care vehicles, the tank(s) and associated lawn care fluid components are intended to be permanently mounted on the truck, thereby limiting use of the truck and/or making detachment of the tank(s) and other components difficult. Often times, in many lawn care vehicles, the tanks and other components are simply mounted in any convenient location on the vehicle, with little consideration given to the effects on the appearance and aerodynamics of the vehicle.

What is needed is a lawn care system for applying lawn care fluids which eliminates the use of gas powered pumps and PTO drives, and which is designed to be easily mounted on and removed from a vehicle, thereby allowing the vehicle to be used for other purposes.

SUMMARY OF THE INVENTION

The present invention provides a lawn spray applicator system which is used on a vehicle having a vehicle electrical power system. In particular, the present invention provides a lawn spray applicator system that is specifically designed to be easy to use by an operator and which minimizes electrical usage, thereby allowing use of the applicator system with standard vehicle electrical power systems.

A preferred embodiment of the lawn spray applicator system for use on a vehicle having a vehicle electrical power system includes an applicator module that is removably mountable on the vehicle. The applicator module preferably includes a housing, at least one liquid supply tank disposed in the housing and a liquid dispensing system disposed in the housing and connected to the liquid supply tank for dispensing liquid from the liquid supply tank and onto a lawn. A control system is electrically connected to the liquid dispensing system for providing electrical power to, and controlling the operation of, the liquid dispensing system. Further, the control system is adapted to be electrically connected to the vehicle electrical power system which supplies power to the control system. Since power is provided by the vehicle electrical power system, the use of separate gas engines, electrical generators, and PTO drives to provide power are eliminated.

The present invention further relates to a control system for controlling the operation of a lawn care applicator module that is mounted on a vehicle. The control system is specifically designed to minimize electrical current usage to allow use with the vehicle's own electrical power system to provide power for the electrical components of the applicator module.

A preferred embodiment of the control system for controlling operation of an applicator module that is mounted on a vehicle having a vehicle electrical power system includes a controller that is adapted to be electrically connected to the applicator module for providing electrical power thereto and controlling the operation thereof. The controller is also adapted to be electrically powered by the vehicle electrical power system. A control pendant is electrically connected to the controller for providing control inputs in order to control operation of the applicator module. The control system of the present invention thus operates with the vehicle's electrical power system to provide power to the applicator module, with the control pendant providing easy operator control of the operation of the applicator module.

The present invention further relates to a lawn care applicator module that is adapted to be removably disposed on a vehicle, such as in the box of a pick-up truck type vehicle. The removable nature of the applicator module allows the vehicle to be used for other purposes by simply removing the applicator module.

A preferred embodiment of the lawn care applicator module for use with a vehicle having a vehicle box includes a housing that is adapted to be removably disposed within the vehicle box. The housing defines an interior space, and at least one liquid supply tank is mounted within the interior space. A liquid dispensing system is also disposed within the housing and is connected to the liquid supply tank for dispensing liquid therefrom onto a lawn. This monolithic concept allows the vehicle to be used for other purposes by simply removing the housing from the vehicle, thereby expanding the range of uses for the vehicle.

These and various other advantages and features of novelty which characterize the invention are pointed out with particularity in the claims annexed hereto and forming a part hereof. However, for a better understanding of the invention, its advantages and objects attained by its use, reference should be made to the drawings which form a further part hereof, and to the accompanying description, in which there is described a preferred embodiment of the invention.

BRIEF DESCRIPTION OF THE DRAWINGS

FIGS. 8A and 8B are an end view and a side view partly in section, respectively, of the hose reel assembly.

DETAILED DESCRIPTION OF THE PREFERRED EMBODIMENT

Figure 1:
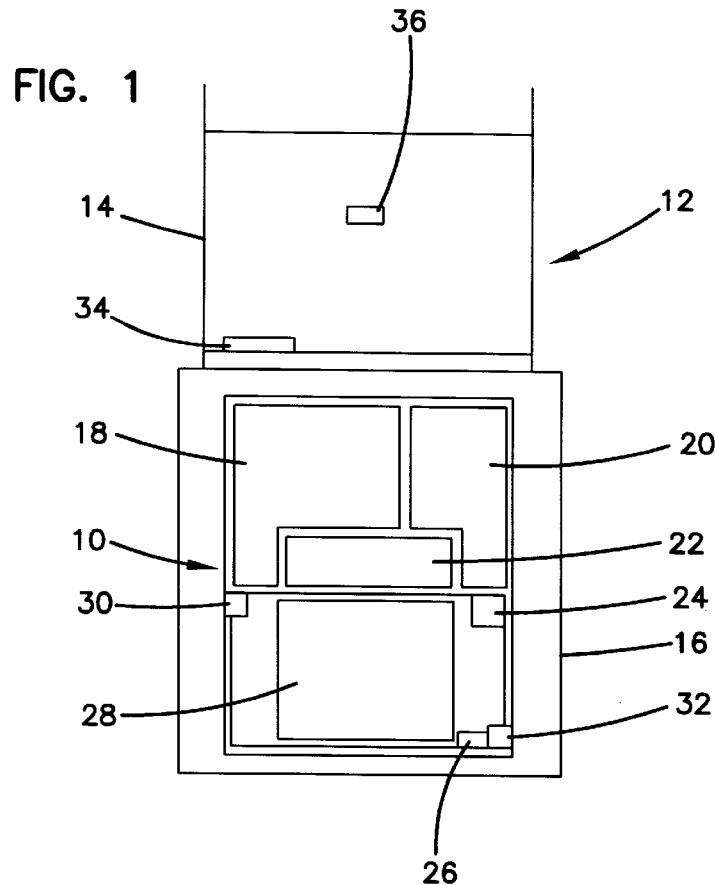
FIG. 1 is a top view illustrating the arrangement of the applicator module mounted in the box of a pickup truck.

With reference initially to FIG. 1, the applicator module 10, in its preferred form, is illustrated as being mounted on a pickup truck 12. The pickup truck 12 is generally conventional and includes a cab 14 at the front end thereof in which an operator sits to operate the vehicle, with a truck box 16 extending rearwardly from the cab 14. Although shown and described herein as used on a pickup truck, the applicator module 10 could be designed for use with other vehicles, such as flat-bed utility vehicles.

The module 10 generally includes a first tank 18 which holds a first lawn care fluid, such as a first fertilizer fluid, a second tank 20 which holds a second lawn care fluid, such as a second fertilizer fluid, and a third tank 22 which holds a third lawn care fluid, such as a herbicide fluid. The tanks 18,20,22 can be any size, and in the embodiment shown are 200 gallons, 100 gallons, and 25 gallons, respectively. As will be described below, pumps are connected to the tanks to pump fluid therefrom during application of the lawn care fluid(s). A pressure regulator assembly 24 is provided on one side of the module to control the pressure of the fluid pumped from the tanks 18,20, with a tank selection lever 26 provided to select which tank 18,20 to pump from. The module 10 further includes a hose reel assembly 28 for spraying the lawn care fluids onto a lawn, with the hose reel assembly including a motor to retract the hose when spraying is complete, as will be described below. A pair of reel retract switches 30,32 are provided on opposite sides of the module 10 to permit an operator to actuate the hose reel assembly motor from either side of the vehicle to thereby retract the hose.

Operation of the module 10 is controlled by a controller 34 mounted within the cab 14, generally behind the drivers seat although the controller 34 could be located at any desired position within the cab. While the controller 34 is described as being preferably located in the cab, the controller could also be located in a weather proof enclosure and placed in the truck box 16. The controller 34 provides the electrical power and control for the electric motors within the module 10, to be later described. Operator control of the module 10 is provided by a pendant 36 mounted under the dashboard within the cab 14 or mounted in some other suitable location within the cab.

Figure 2:
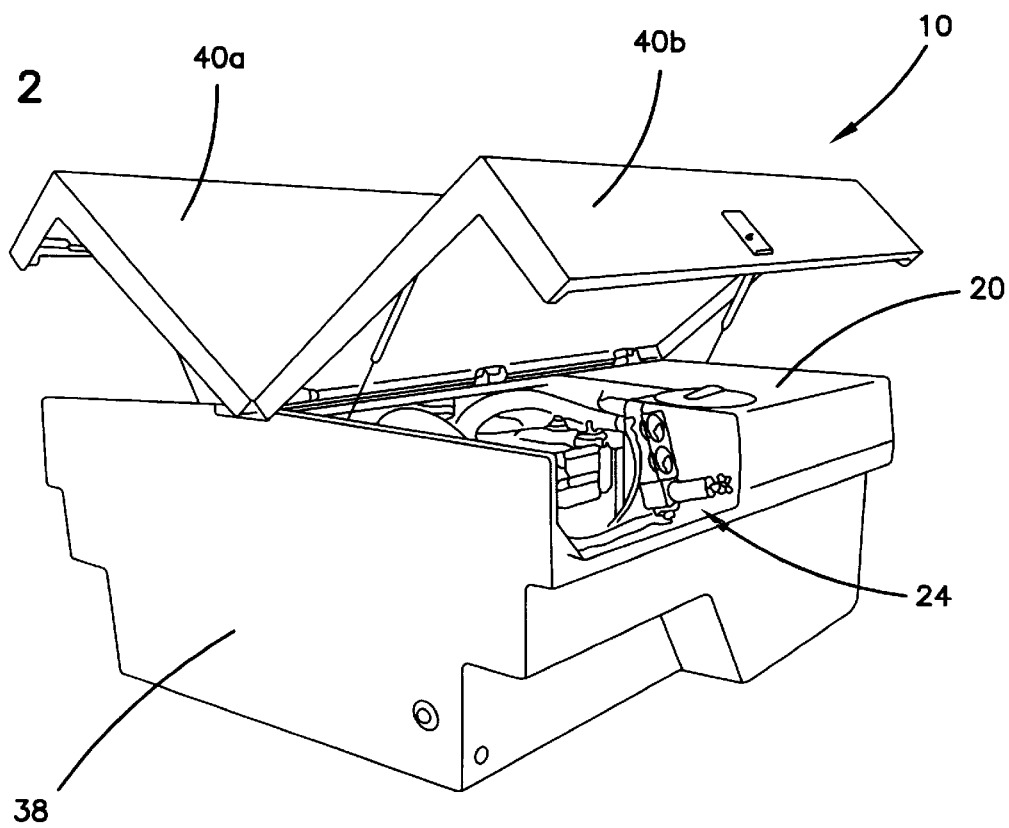
FIG. 2 is a perspective view of the applicator module.

FIG. 2 illustrates the module 10 removed from the truck box 16, with the module 10 including a housing 38 made of fiberglass or the like which is adapted to fit within the truck box 16 and to be removably secured therein. The housing 38 is generally hollow, with access to the interior of the housing being controlled by gull wing doors 40*a*,40*b* that are pivotally mounted to the housing. The gull wing doors 40*a,b* allow complete access to the components mounted within the interior of the housing 38, while providing security and clean line aesthetics when the doors are closed. The tanks 18,20,22, pressure regulator assembly 24, tank selection lever 26, hose reel assembly 28, reel retract switches 30,32 and other components to be later described, are all disposed within the housing 38 to form the module 10. The entire module 10 can thus be removed as a single unit from the truck box 16, thereby allowing the truck 12 to be used for other purposes.

It should be realized that the applicator module in accordance with the present invention could have a larger or smaller number of tanks, pumps and other components, and the elements of the module could be arranged in other configurations. Therefore the term "applicator module" as used herein is intended to encompass other embodiments as well.

Figure 3A:
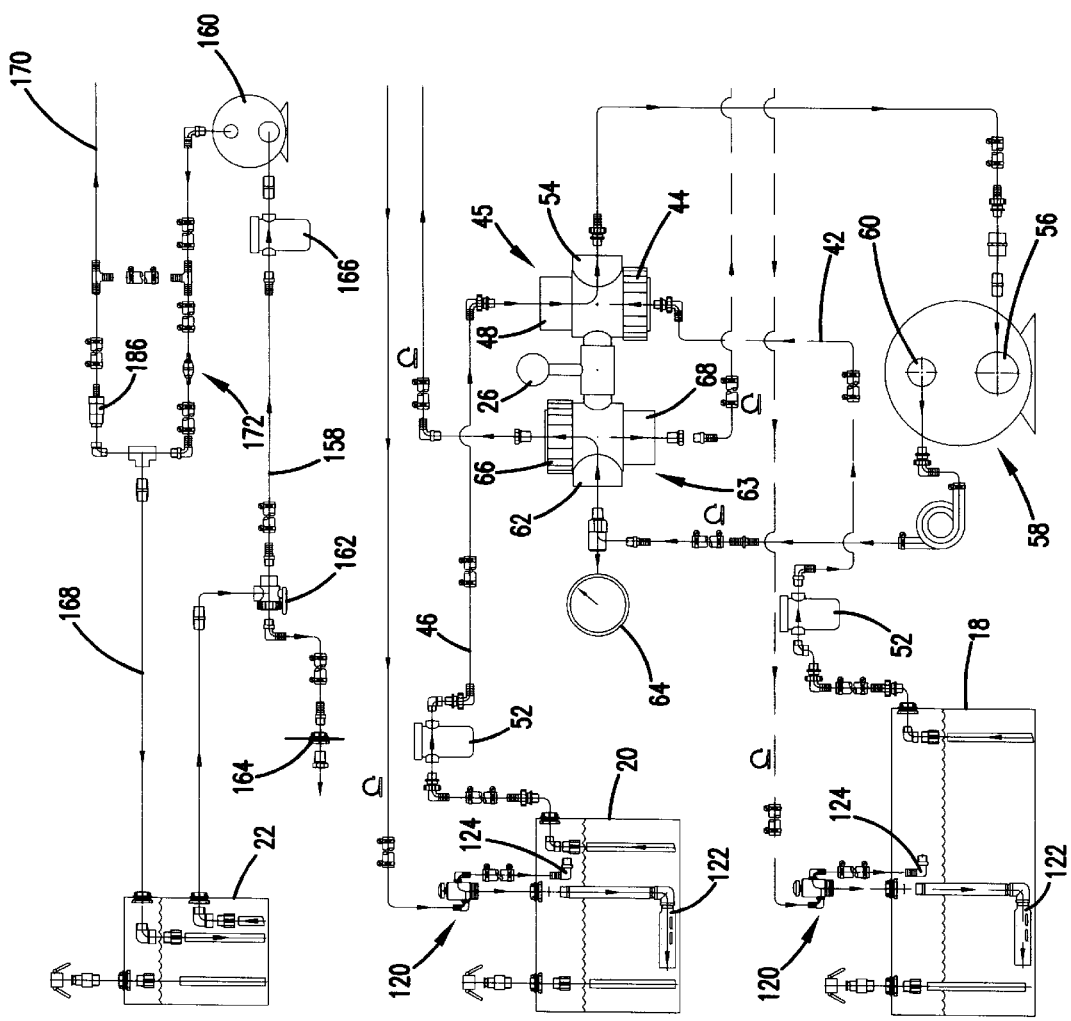
FIGS. 3A and 3B schematically illustrate the fluid dispensing system of the present invention.
Figure 3B:
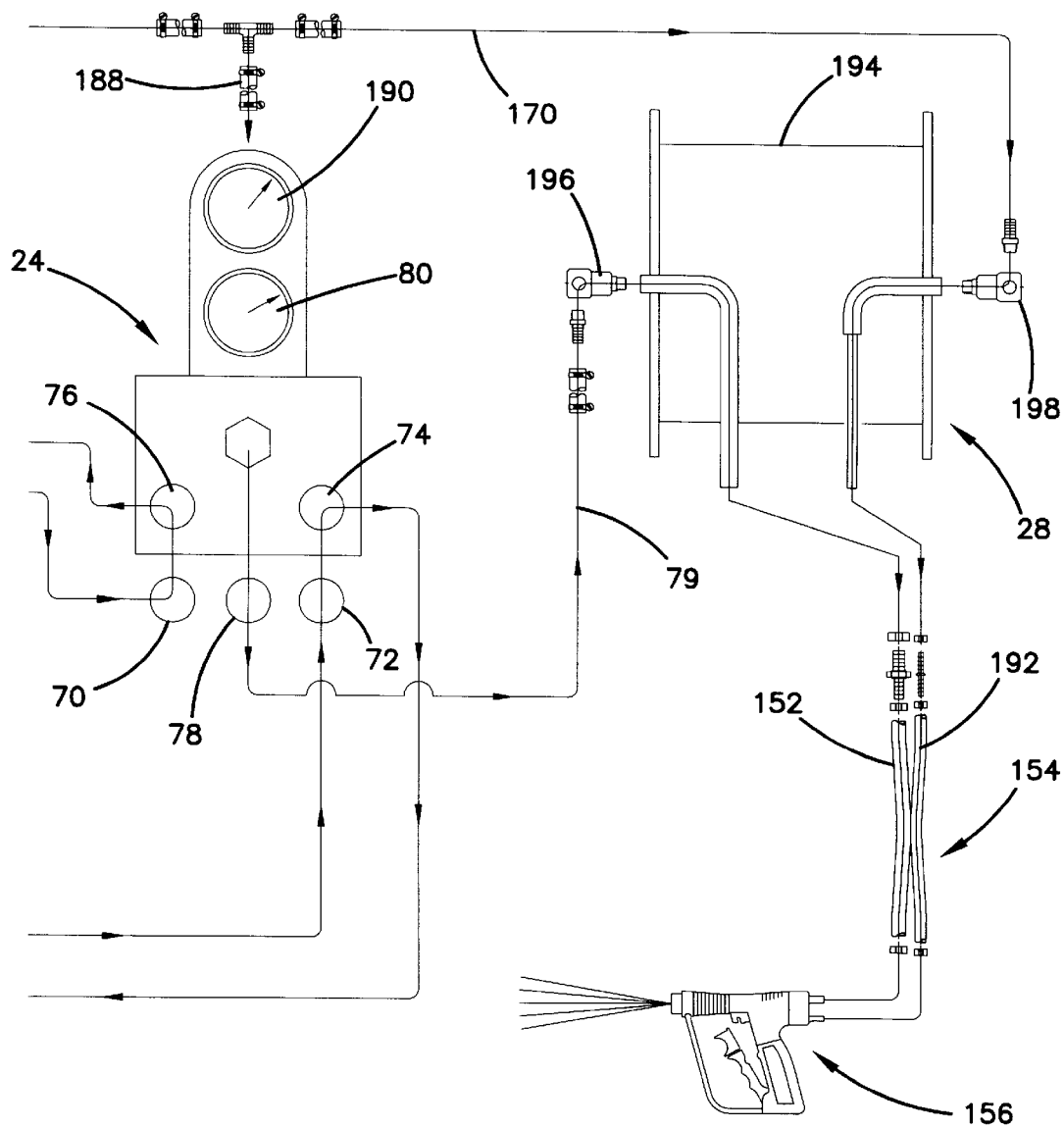

FIGS. 3A and 3B illustrate the plumbing schematic of the fluid distribution system which is mounted within the module 10 and is used to distribute the lawn care fluids from the tanks 18,20,22 to the hose reel assembly 28 for subsequent spraying onto the lawn. A line 42 connects the tank 18 to an inlet port 44 of an inlet valve 45 controlled by the selection lever 26, and a further line 46 connects the tank 20 to a second inlet port 48 of the valve 45. The valve 45 is preferably a conventional ball valve arrangement of the type having the two inlets 44,48 and a single outlet port 54, whereby operation of the selection lever 26 enables selection of the tank 18,20 from which to pump from, by controlling flow from the inlet ports 44,48 to the outlet port 54. As illustrated in FIG. 3A, the valve 45 is positioned to allow flow from the tank 20, through the inlet port 48 and out the outlet port 54.

A strainer 52 is provided in each line 42,46 in order to remove unwanted contaminants from the liquids pumped from the tanks 18,20. The outlet port 54 of the valve 45 is connected to the inlet 56 of a fertilizer tank pump 58, with the pump discharge 60 being connected to an inlet 62 of a discharge valve 63. The pump 58 is preferably a high efficiency, motor driven diaphragm type pump, such as the Hydra-Cell pump, Model No. D10C1100002, manufactured by Wanner Engineering, Inc., of Minneapolis, Minn. A pressure gauge 64 is preferably disposed in the discharge line of the pump 58 in order to measure the pump discharge pressure. From the inlet 62 of the valve 63, the fluid exits one of two discharge ports 66,68 which are fluidly connected to the pressure regulator assembly 24. The valve 63, like the valve 45, is a conventional ball-type valve, however the valve 63 includes the single inlet 62 and the pair of outlets 66,68. The valve 63 is also controlled by the selection lever 26, with the valve 63 being arranged such that in the position shown in FIG. 3A, the liquid discharged from the pump 58 flows into the inlet 62 and through the outlet 66 to the regulator assembly 24.

As mentioned previously, the tank selection lever 26 allows the operator to select which tank 18,20 to pump from. As illustrated in FIG. 3A, the lever 26 and valves 45,63 are arranged to pump from tank 20 and to output liquid through the outlet port 66. By simply rotating the selection lever 26 in the appropriate direction, the valves 45,63 are actuated so that the inlet port 48 is closed off and liquid is allowed to flow from the inlet port 44 to the outlet port 54 to thereby pump from the tank 18, and the outlet port 66 is closed and liquid instead flows from the inlet port 62 through the outlet port 68. Thus tank selection is provided by actuating a single control lever 26 which actuates the inlet valve 45. Further, the provision of the discharge valve 63 distributes the liquid from the tank that is being pumped from to the correct port of the regulator assembly 24, to thereby ensure that any liquid returned from the regulator assembly to the tank, in a manner to be described below, is returned to the tank from which it was pumped. In this manner, the liquid that is pumped from the tank 18 is prevented from being returned to the tank 20, and vice versa, thereby preventing mixing of the two liquids.

The pressure regulator assembly 24 includes a first inlet port 70 connected to the outlet port 66 of the valve 63, and a second inlet port 72 connected to the outlet port 68 of the valve 63. Outlet ports 74,76 on the regulator assembly 24 are connected to the tanks 18,20, respectively, in order to return liquid back to the tank from which is was pumped. A further outlet port 78 on the regulator assembly 24 is connected through a line 79 to the hose reel assembly 28 for spraying liquid from one of the tanks 18,20 onto the lawn. A pressure gauge 80 is provided to measure the pressure of the liquid exiting from the regulator assembly 24. The pressure regulator assembly 24 is constructed to allow the operator to control the pressure of the liquid that is supplied to the hose reel assembly 28 from the selected tank 18 or 20, as well as allowing a portion of the liquid to be returned to the selected tank 18 or 20 from the outlet port 74 or 76, for a purpose which will become apparent later in the description.

Figure 4:
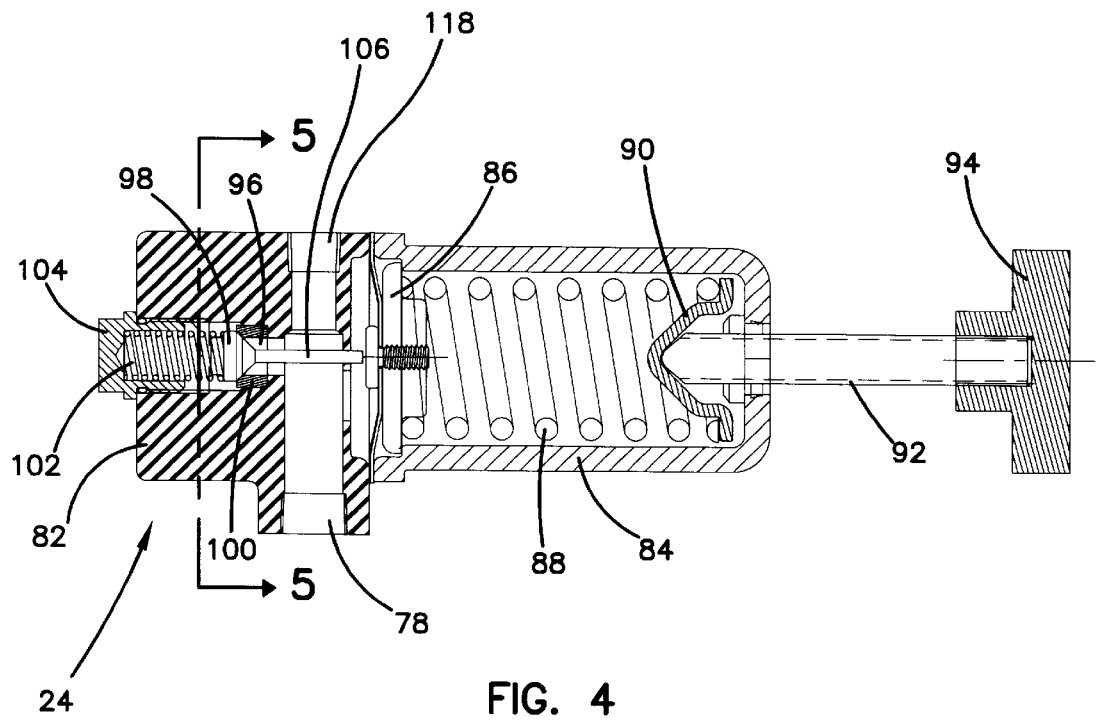
FIG. 4 is a longitudinal cross-sectional view of the fluid pressure regulator.
Figure 5:
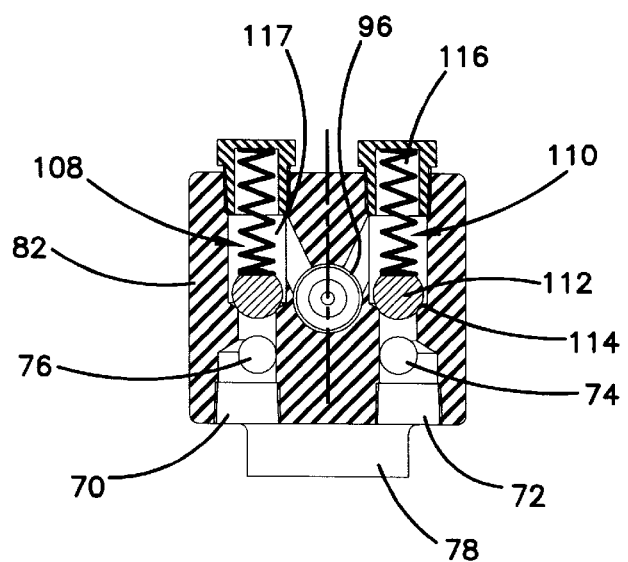
FIG. 5 is a cross-sectional view taken along line 5—5 of FIG. 4.

The regulator assembly 24 is illustrated in detail in FIGS. 4 and 5, where it is seen that the assembly 24 includes a body 82 in which are formed the ports 70,72,74,76,78. A housing 84 is secured to the body 82, with the perimeter of a diaphragm assembly 86 sandwiched between the body 82 and the housing 84 to allow the central portion of the diaphragm assembly 86 to move a predetermined distance. A biasing spring 88 is disposed within the housing 84, and is engaged at one end with the diaphragm assembly 86 and at the opposite end thereof engages with a pivot 90 that is moveably disposed in the housing 84, so that the diaphragm assembly and pivot are biased apart. A threaded adjusting screw 92 extends through a threaded aperture in the end of the housing 84 and engages with the pivot 90, with a knob 94 secured to the opposite end of the adjusting screw 92 facilitating manual rotation of the adjusting screw. Therefore, as the adjusting screw 92 is rotated in one direction, it moves further into the housing, thereby forcing the pivot 90 toward the diaphragm assembly 86 against the bias of the spring. This causes the central portion of the diaphragm assembly 86 to be actuated in a direction toward the body 82 to adjust the amount of liquid that is allowed to flow from the outlet 78, in a manner described below, thereby adjusting the pressure measured by the gauge 80. Rotation of the adjusting screw 92 in the opposite direction retracts the screw 92, with the spring 88 maintaining the pivot 90 in engagement with the screw 92.

The body 82 is formed with a central passage 96 extending parallel to the axis of the housing 84, with the passage 96 disposed between the inlet ports 70,72 and which intersects the outlet port 78. Fluid flow through the passage 96 is controlled by a valve 98 which seats against a valve seat 100 secured in the passage 96. A biasing spring 102 engages the bottom of the valve 98, thereby biasing the valve into engagement with the valve seat 100, with a plug 104 threaded into the bottom of the body 82 supporting the opposite end of the spring 102 and maintaining the spring 102 aligned with the passage 96. A stem 106 extends upward from the valve 98 to a point adjacent the diaphragm assembly 86 so as to be actuated thereby as the diaphragm assembly 86 is actuated by the screw 92. As the diaphragm assembly 86 is actuated by the screw 92, it engages the stem 106, forcing it downward against the bias of the spring 102, thereby unseating the valve 98 from the valve seat 100 to permit flow through the passage 96 and into the outlet port 78.

Flow from the inlet ports 70,72 to the central passage 96 is controlled by a pair of check valve assemblies 108,110. Each check valve assembly 108,110 includes a ball 112 which is biased into engagement with a valve seat 114 by a biasing spring 116. The balls 112 control fluid flow from the inlet ports 70,72 to passages 117 which connect with the central passage 96 generally below the valve 98. Fluid is prevented from flowing into the passages 117 as long as the pressure of the fluid discharged from the respective port 66,68 of the valve 26 is unable to unseat the ball 112 from the respective seat 114. As soon as the discharge pressure is high enough, the respective ball 112 is forced from engagement with the valve seat 114, thereby allowing fluid to flow from one of the inlet ports 70,72 to the respective passage 117, and then through the central passage 96 to the outlet port 78 depending upon the position of the valve 98. The fluid that is not able to flow into the central passage 96 will be returned to the tank from which is was pumped by exiting through the respective outlet 74,76.

A pressure gauge port 118 communicates with the outlet port 78, with the pressure gauge 80 being connected to the gauge port 118 in order to measure the output pressure of the regulator assembly 24. It should be realized that since the outlet port 66 of the discharge valve 63 is connected to the inlet port 70 of the regulator assembly, and the outlet port 68 of the valve 63 is connected to the inlet port 72, only the liquid from the tank 18,20 that is currently being pumped from (as controlled by the inlet valve 45) will be supplied to the regulator assembly 24 at any one time. Further, the design of the check valve assemblies 108,110 prevents cross-over of the liquid from the inlet 70 to the outlet 74, and also from the inlet 72 to the outlet 76, thereby preventing mixing of the liquids.

Returning now to FIGS. 3A and 3B, it is seen that the liquid which exits the respective outlet port 74,76 flows back to the respective tank 18,20, through an air-purge valve assembly 120 located in the return line. From each valve assembly 120, the returned liquid normally flows into a conventional hydrafluid agitator 122 disposed within the respective tank 18,20, thus providing agitation of the liquid within the tanks 18,20. Hydrafluid agitators are known in the art, and the details thereof are not described herein.

Often times air gets into the various lines of the system, causing priming and metering difficulties, as well as pressure fluctuations. Therefore, in order to purge the air within the system, each valve assembly 120 is provided with a bypass line 124 which leads into the respective tank 18,20 above the fluid line thereof, such that the respective fluid does not flow through the agitator 122 but is instead dumped directly into the tank. The air purge valves 120 permit rapid purging of the air within the system by bypassing the liquid through the bypass line 124.

Figure 7:
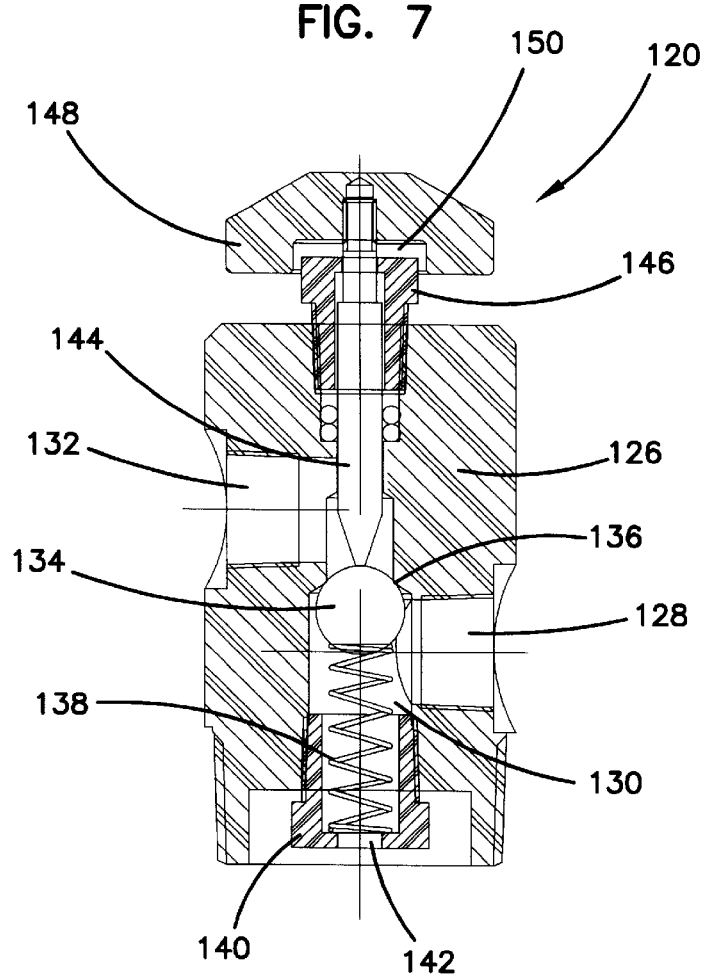
FIG. 7 is a longitudinal cross-sectional view of an air-purge valve assembly.

Turning to FIG. 7, the air-purge valve assembly 120 is shown to include a valve body 126 having an inlet passage 128 connected to the respective return line leading from the outlet port 74,76 of the regulator assembly 24. A passage 130 is formed in the valve body 126 so as to intersect the inlet passage 128, with the passage 130 being connected to the agitator 122. A further passage 132 is formed in the valve body 126, with the passage 132 being connected to the bypass line 124. A ball valve 134 is moveably disposed within the passage 130 to selectively control flow between the inlet passage 128 and the outlet passages 130,132. The ball 134 is biased upward by a spring 138 into engagement with a valve seat 136 defined in the passage 130. The spring 138 is disposed within the passage 130 and engages at one end with the ball 134 and engages at its opposite end with a plug 140 which is screwed into, or otherwise secured within, the passage 130. The plug 140 is generally cylindrical and includes an aperture 142 in the end thereof to permit fluid flow therethrough.

An actuating stem 144 extends through a nut 146 secured at the end of the valve body 126 and into engagement with the top of the ball 134, with the stem 144 being slideable relative to the nut 146 to thereby selectively actuate the ball 134 away from the valve seat 136 to permit fluid flow from the inlet 128 to the outlet 132 and to the bypass line 124. A knob 148 is fastened to the upper end of the stem 144 for actuating the stem, with the bottom of the knob 148 having a cut-out portion 150 which is sized for receiving the nut 146 to thereby limit the extent of movement of the stem 144 and knob 148 when the knob is manually pushed downward.

As is clear from FIG. 7, the valve assembly 120 is arranged so that the liquid normally flows from the inlet passage 128 and through the passage 130 to the agitator 122. However, when air needs to be purged, the operator simply holds the knob 148 and stem 144 down, which unseats the ball 134 from the seat 136, thereby allowing liquid to flow to the passage 132 and to the bypass line 124. Since the liquid bypasses the agitator 122, and the flow restriction caused thereby, the pump 58 runs at full flow, allowing trapped air within the system to be quickly purged. Thus, by simply pushing the knob 148 for a brief period of time, the air in the system is quickly removed. Without such a valve assembly 120, it could take hours to purge the system of air, and in some cases it is impossible to fully purge the air. Once the air is purged, the knob 148 is released, with the spring 138 then biasing the ball 134 and stem 144 back to their original positions, so that the liquid again flows through the agitator 122.

Returning once again to FIGS. 3A and 3B, it is seen that liquid exiting the outlet port 78 of the regulator assembly 24 flows to the hose reel assembly 28, through the line 79, and into a first line 152 of a dual line hose assembly 154. The hose assembly 154 is in turn connected to a dual fluid injection spray gun 156.

The remaining tank 22, which preferably contains the herbicide liquid, is connected by a line 158 to the inlet of a pump 160. The pump 160 is preferably a high efficiency, motor driven diaphragm type pump, such as the Hydra-Cell pump, Model No. F20C1100001, manufactured by Wanner Engineering, Inc., of Minneapolis, Minn. A valve 162 is disposed in the line 158 to selectively permit flow to the pump 160 or to a drain 164, and a strainer 166, similar to the strainer 52, is disposed within the line 158 to remove unwanted contaminants from the liquid that is pumped from the tank 22. The tank 22 further includes a motor driven agitator therein, which is not shown in FIGS. 3A,3B, in order agitate the liquid within the tank 22. The motor driven agitator will be described below in FIGS. 9A, 9B, 10 and 11.

A line 168 leads from the discharge of the pump 160 back to the tank 22 and a further line 170 leads to the hose reel assembly 28, with the flow being controlled by an automatic air bleed assembly 172 and a relief valve assembly 186.

Figure 6:
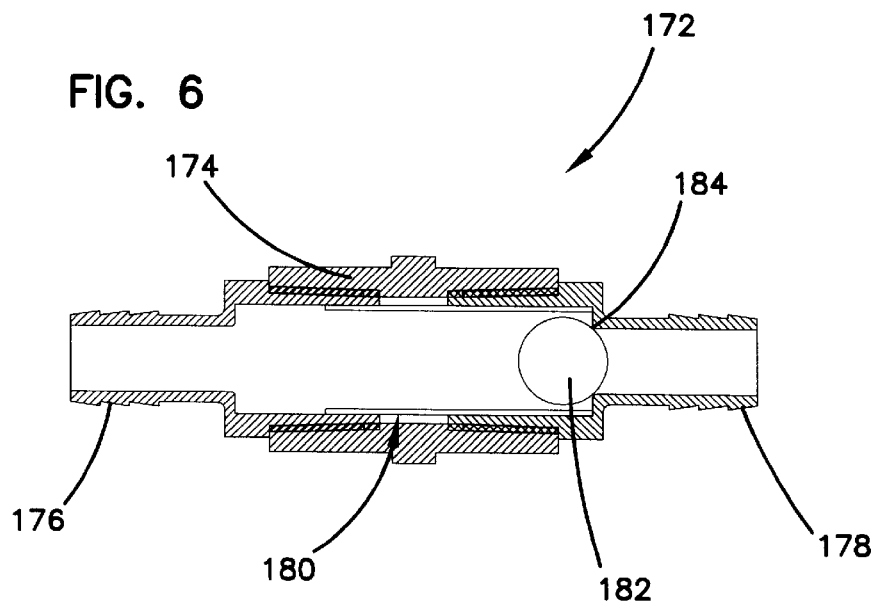
FIG. 6 is a longitudinal cross-sectional view of the automatic air bleed assembly.

The air bleed assembly 172 is illustrated in detail in FIG. 6, where it is seen that the assembly includes a cylindrical housing 174 having an inlet end 176 connected to the discharge of the pump 160 and an outlet end 178 connected to the line 168. A sleeve 180 is disposed within the housing 174 between the inlet end 176 and the outlet end 178, and a ball 182 is disposed within the sleeve 180. The ball 182 is illustrated in FIG. 6 in a closed position seated against a valve seat 184 in which fluid flow is prevented between the inlet end 176 and the outlet end 178, however due to the weight of the ball 182, the ball can unseat from the valve seat 184 when no fluid is being discharged by the pump 160 or when a liquid/air mixture is being discharged by the pump. The diameter of the ball 182 is less than the inner diameter of the sleeve 180 such that air is allowed to flow past the ball from the inlet end 176 to the outlet end 178 when the ball 182 is disengaged from the valve seat 184. The ball 182 is relatively heavy, for example it can be made of steel or the like, such that the ball is moved within the sleeve 180 only when relatively air-free liquid is discharged from the pump 160.

Thus, when there is air within the pump 160 and line 158, the ball 182 is unseated from the seat 184, and the air and liquid combination can flow past the ball back to the tank 22 through the line 168, whereby the air is purged from the liquid. This air purging process continues until the majority of air is eliminated, at which point the discharge of the pump 160 is mainly liquid that is free of air such that mainly liquid is acting on the ball 182. When the force of the liquid acting on the ball is large enough, i.e. when the majority of air has been eliminated, the ball 182 is forced to the right and engages the seat 184, thereby preventing further flow to the tank 22. The liquid then flows through the line 170 to the hose reel assembly 28. The air bleed assembly 172 thus automatically purges air from the pump 160 and line 158, thus providing fast and effective priming of the pump 160.

The relief valve assembly 186 is preferably a conventional one-way check valve to limit the pressure within the line 170 by allowing excess pressure to be dumped to the tank 22. As shown in FIG. 3B, a line 188 leads from the line 170 to a pressure gauge 190 on the regulator assembly 24 in order to measure the discharge pressure of the pump 160. As stated previously, the line 170 leads to the hose reel assembly 28 where it is connected to a second line 192 of the dual line hose assembly 154.

The dual line hose assembly 154 thus allows simultaneous spraying of the selected liquid from the tank 18 or 20, and the liquid from the tank 22, i.e. both fertilizer and herbicide spraying. The spray gun 156, which is connected to the hose assembly 154, is preferably designed to allow turning off all spray, allow spray of the liquid from the line 152 only, or allow a combined spray from the lines 152,192. A suitable spray gun for use with the present invention is disclosed in U.S. Pat. No. 5,667,143, the disclosure of which is hereby incorporated by reference.

Figure 8B:
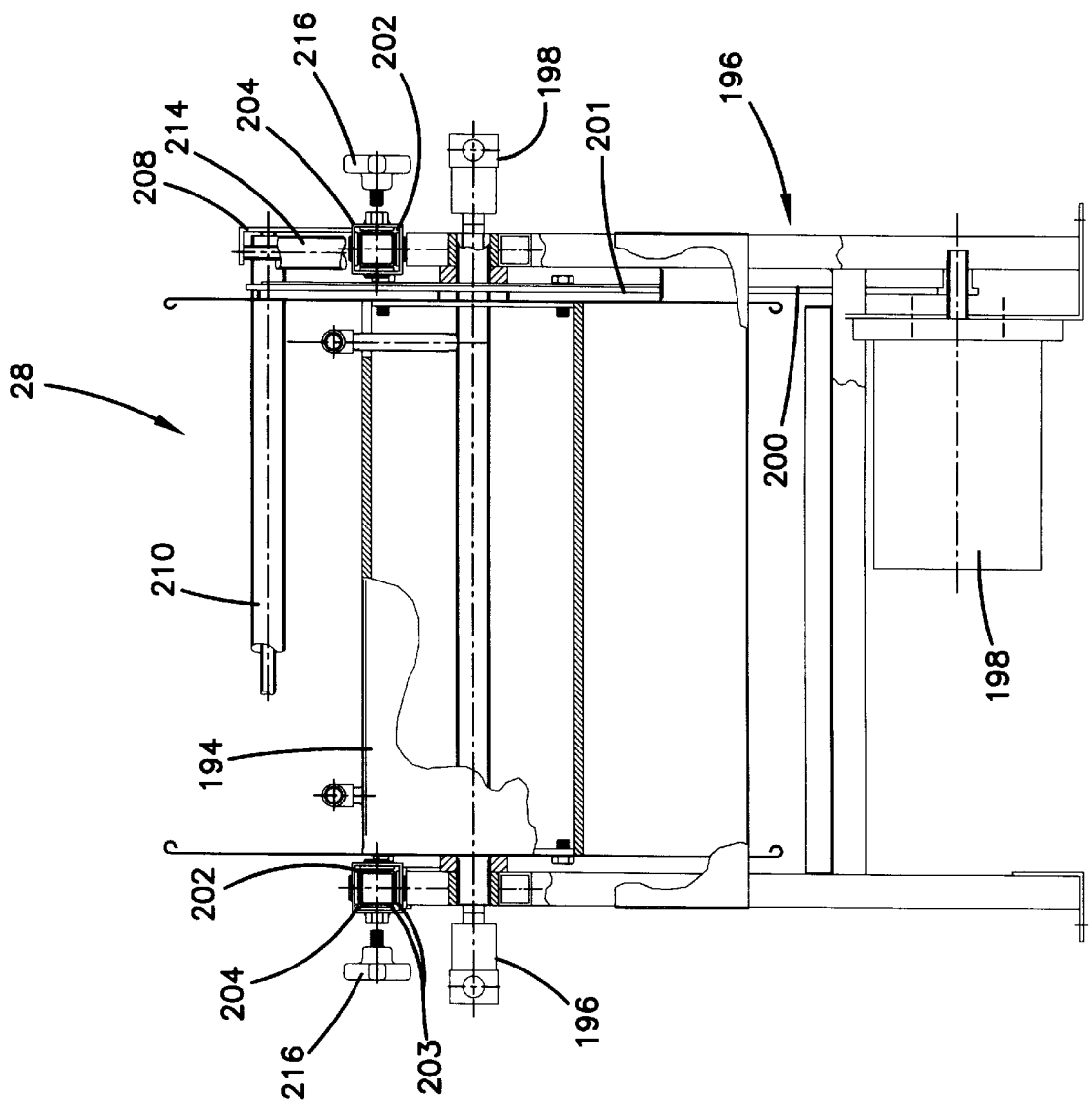

The hose reel assembly 28 is illustrated in FIGS. 3B,8A and 8B, where it can be seen that the hose reel assembly 28 includes a cylindrical reel 194 upon which the lines 152,192 of the dual line hose assembly 154 can be wound during non-use periods, and from which the dual line hose assembly 154 can be unwound in order to permit spraying. A pair of swivels 196,198 are provided at each end of the reel 194 to permit fluid passage from the lines 79,170 to the lines 152,192, respectively, while permitting rotation of the reel 194.

The reel 194 is rotatably mounted at each of its ends on a suitable framework 196 mounted in the module 10. A motor 198 is mounted on the framework and is in driving engagement with the reel 194 so as to rotate the reel. As shown in FIGS. 8A and 8B, the drive connection is preferably a chain 200 that is driven by the motor 198 and which engages a drive sprocket 201 attached to one end of the reel 194. However, other drive connections, such as a drive belt and friction pulley arrangement, can be used if desired. Operation of the reel motor 198 is controlled by either one of the reel retract switches 30,32 positioned on opposite sides of the module 10, as seen in FIG. 1, such that when one of the switches is pressed, the reel motor is actuated to thereby rotate the reel 194 and retract the hose assembly 154. Thus, automatic retraction or winding of the hose assembly 154 onto the reel 194 is provided.

The hose reel assembly 28 further includes a pair of extension arms 202 mounted on the framework 196 at each end of the reel 194. Each extension arm 202 extends through supports 204,206 mounted on the framework 196 at each end of the reel. Rollers 203 are disposed within the supports 204,206 and engage the arms 202 such that the arms 202 are allowed to slide back and forth relative to the supports 204,206 in the direction of the arrow shown in FIG. 8A. Brackets 208 are fixed to the ends of each arm 202, and a pair of vertically spaced, horizontal hose guide rollers 210, 212 are connected at each end to the brackets 208 in a manner to allow free rotation of the rollers 210,212. A vertical hose guide roller 214 is also rotatably mounted on each bracket 208 to allow free rotation of the roller 214. A locking knob 216 is provided on each support 204, with the knobs 216 being conventionally constructed so as to engage the extension arms 202 when screwed inwards to thereby lock the arms 202 in a desired position. Reverse rotation of the knobs 216 disengages the knobs from the arms 202 to allow further movement of the arms.

The slideable extension arms 202 are provided to allow the operator of the module to use the hose reel assembly 28 from either side of the vehicle 12. With reference to FIG. 8A, assuming that one is looking from the rear of the vehicle toward the front, if the operator wishes to use the hose assembly 154 on the right side of the vehicle, the extension arms 202 are slid all the way to the right and locked in position as is shown in FIG. 8A. The spray gun 156 and hose assembly 154 are then threaded between the horizontal rollers 210,212 located on the right side of the arms 202, with the operator then pulling the hose assembly 154 to unwind it from the roller 194. The freely rotatable rollers 210,212, 214 allow unimpeded movement of the hose assembly, as well as maintaining the hose assembly in line with the reel 194. Further, the vertical rollers 214 permit the hose assembly to be unwound from the reel at an angle, as well as preventing contact between the hose assembly and the module 10 which might otherwise damage the module.

Should the operator wish to use the hose assembly 154 on the left side of the vehicle 12, the locking knobs 216 are loosened and the extension arms 202 slid all the way to the left and then locked in place by tightening the knobs 216. Instead of threading the spray gun 156 and hose assembly 154 between the rollers 210,212 on the right side of the arms 202, the spray gun and hose assembly are instead threaded between the rollers 210,212 on the left side, as illustrated in dashed lines in FIG. 8A, with the hose assembly then being unwound from the roller 194 as before. Thus the extension arms 202 can be slid toward either side of the vehicle to facilitate spraying operations on each side of the vehicle.

As mentioned previously, the controller 34 mounted within the vehicle cab 14 provides the power and control for the electrical motors in the module 10, e.g. motor 220 for pump 58, motor 222 for pump 160, the motor 198 for the hose reel assembly 28, and motor 224 for the agitator in the tank 22. The controller 34 is connected to the vehicle's electrical power system in a manner to be described below, in order to provide electrical power to the system as a whole. Since electrical power is provided by the vehicle's electrical power system, the use of separate power sources, such as electrical generators, gas engines and PTO drives, is eliminated. However, the electrical power available from a vehicle electrical power system is limited, and therefore the control system of the present invention for the various electric motors must be designed to minimize electrical current usage to allow use of the present invention with standard automotive pickup electrical battery/charging systems. The typical power available from a standard pickup truck electrical system is 12V.

Figure 9A:
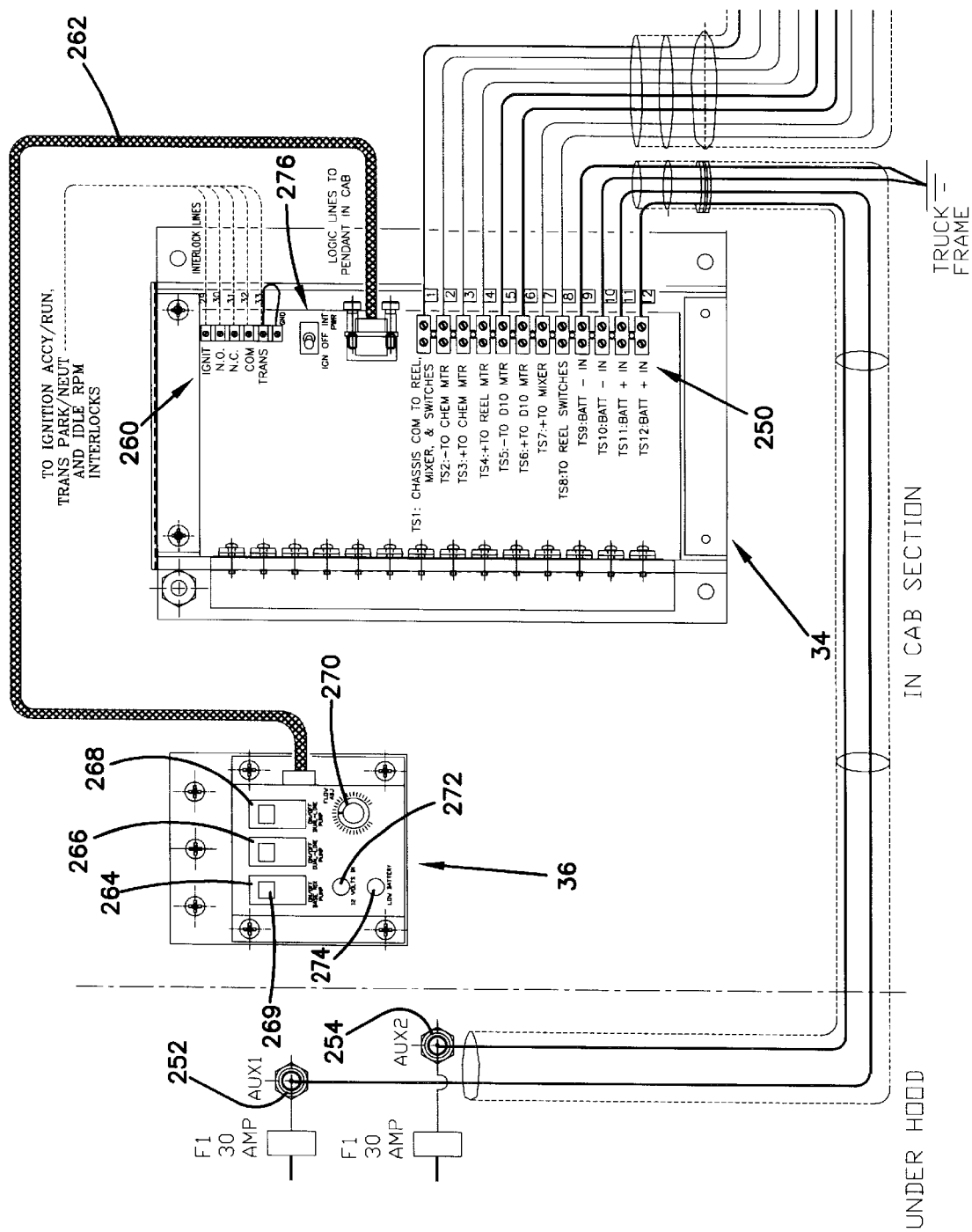
FIGS. 9A and 9B illustrate the wiring between the controller and the pump motors, reel motor and agitator motor.
Figure 9B:
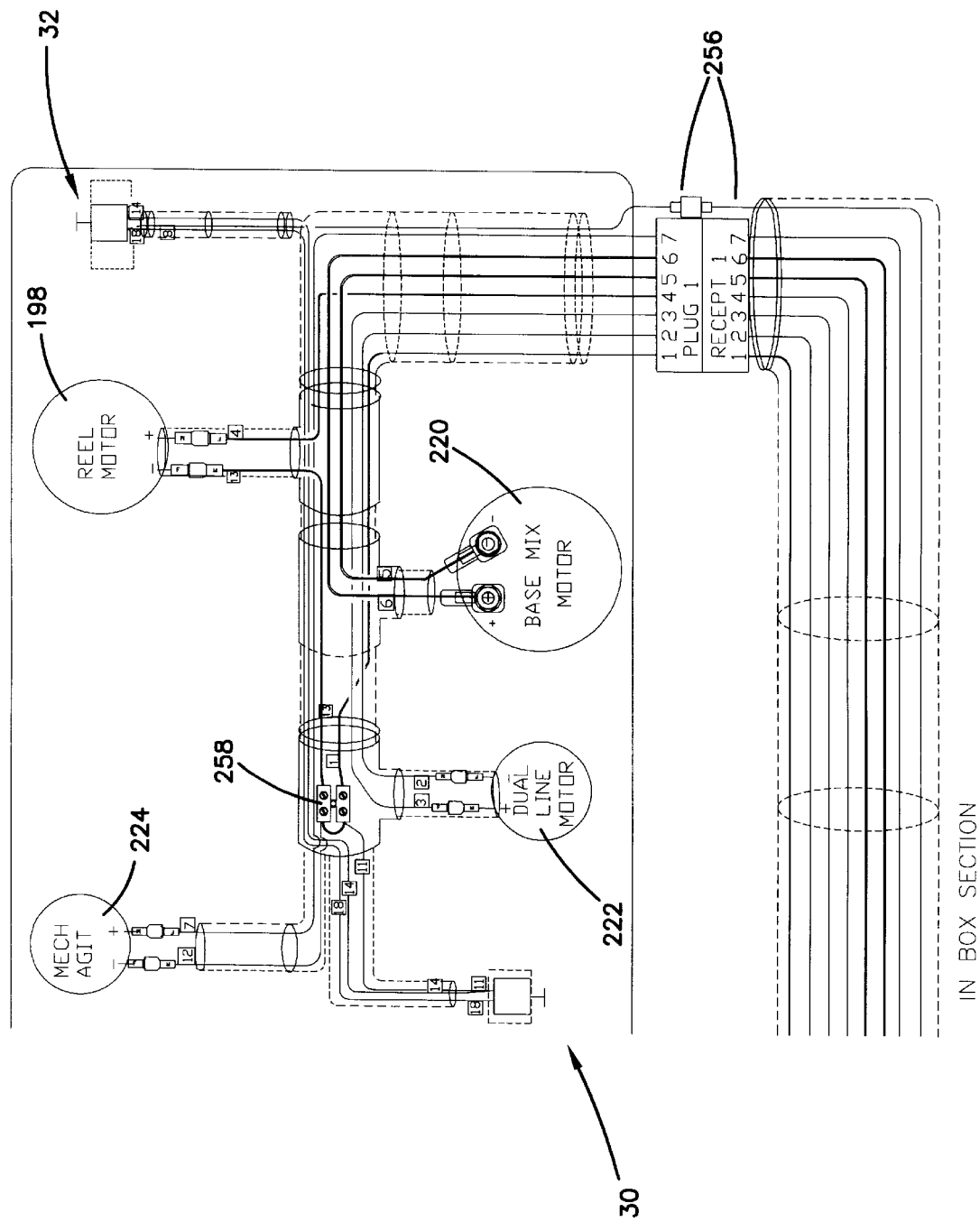
Figure 10:
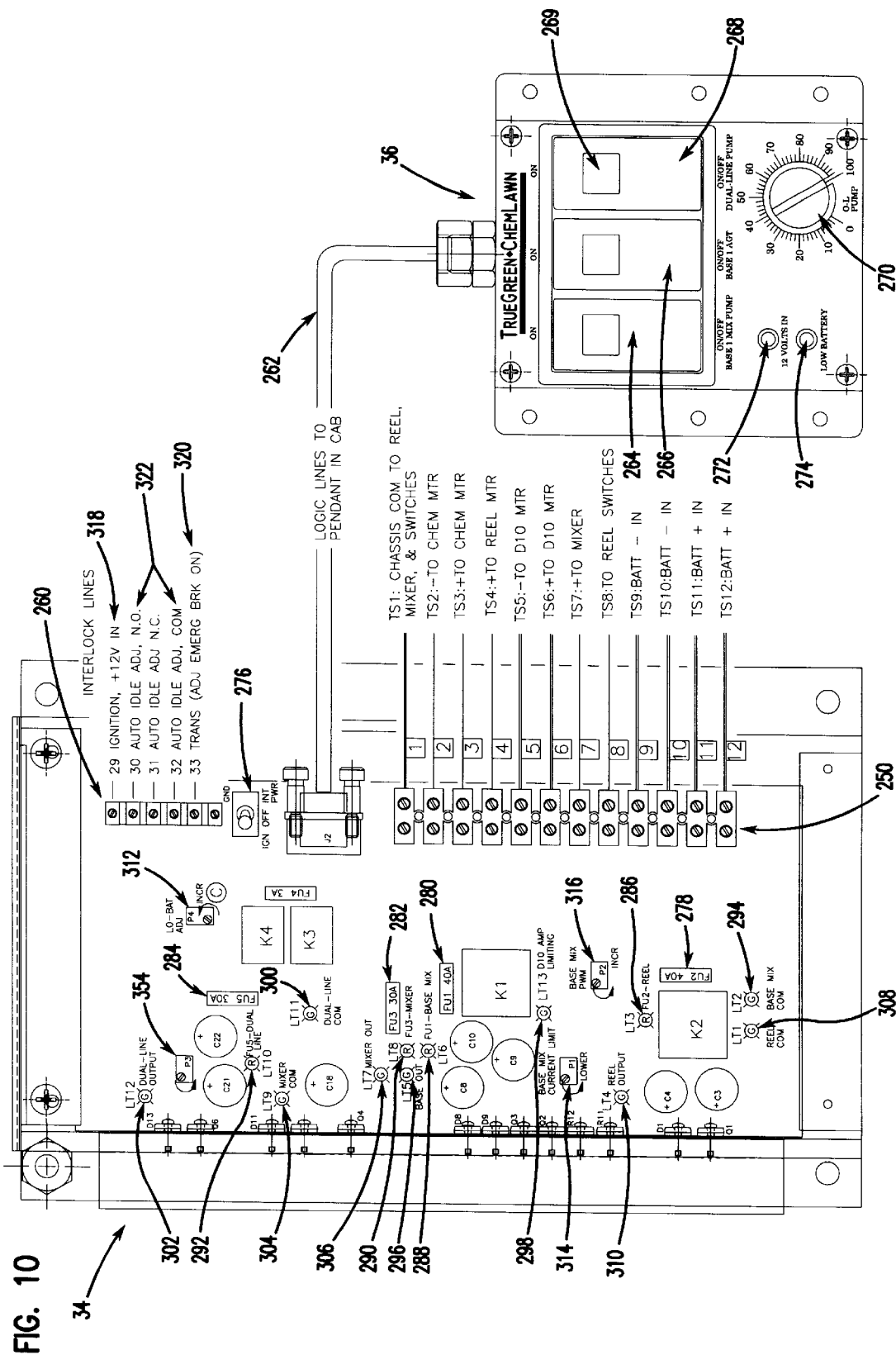
FIG. 10 is a detailed illustration of the controller and the control pendant.

With reference now to FIGS. 9A, 9B and 10, it can be seen that the controller 34 includes a first terminal strip section 250 containing terminal strips 1–12 (TS 1–12). TS11 and TS12 are electrically connected to jacks 252,254 in the fuse box of the vehicle 12, thus providing 12V input electrical power to the controller 34. TS9 and TS10 are grounded to the frame of the vehicle 12. The remaining terminal strips TS1–TS8 are electrically connected to the electrical components 30,32,198,220,222,224 in the module 10 through a conventional electrical receptacle and plug in connector 256 located adjacent the rear of the vehicle 12. Specifically, TS8 is connected to the reel retract switches 30,32; TS7 is connected to the positive terminal of the agitator motor 224; TS5 and TS6 are connected to the negative and positive terminals, respectively, of the motor 220; TS4 is connected to the positive terminal of the reel retract motor 198; TS2 and TS3 are connected to the negative and positive terminals, respectively, of the motor 222; and TS1 is connected to a junction 258 in the module, with the junction in turn connecting to the reel retract motor 198, the agitator motor 224, and the switches 30,32.

The controller 34 further includes an interlock terminal strip section 260 which connect with interlock lines to be later described with reference to FIGS. 10 and 11. The pendant 36 is connected by logic lines 262 to the controller 34, to provide control inputs from the pendant to the controller, as well as providing operating signals from the controller to the pendant. The pendant 36, as previously mentioned, is mounted within the vehicle cab 14, preferably on or under the dashboard, and the pendant 36 includes a switch 264 for turning on and off the motor 220 for the pump 58, a switch 266 for turning on and off the motor 224 for the agitator in tank 22, and a switch 268 for turning on and off the motor 222 for the pump 160, as can be seen in FIGS. 9A and 10. Each switch 264,266,268 is provided with an indicator 269 which lights when the respective switch is on.

Operator control of the pump 160 is provided by a flow adjusting potentiometer 270 on the pendant 36. The potentiometer 270 is electrically connected to the motor 222 to adjust the voltage supplied thereto based upon the rotation position of the potentiometer, which adjusts the speed of the pump 160 and thereby provides flow rate metering of the liquid discharged from the pump 160. The pendant 36 further includes a 12V In indicator light 272 which is illuminated whenever power is supplied to the controller 34, and a low battery indicator warning light 274 which illuminates when the battery voltage of the vehicle drops below a predetermined set point value, such as below 11.3V. When the battery voltage drops below the predetermined set point, the controller 34 will automatically shut off the system as well as the power indicator light 272.

As shown in FIGS. 9A,9B,10 and 11, the controller 34 also includes a power switch 276 which has three settings. If the switch 276 is set to IGN, 12V power is supplied to the system only when the ignition key of the vehicle is at a "run" or "accy" (accessory) position, as controlled by an ignition interlock of the interlock section 260. If the switch 276 is set to OFF, all power is turned off, which is used when the truck is being used for other purposes or to protect against inadvertent operation. If the switch 276 is set to INT PWR, 12V power is applied to the system no matter what position the ignition key of the vehicle is in by bypassing the interlocks of the interlock section 260 and allowing for troubleshooting operations. It is to be noted that the IGN position of the switch 276 allows the system to be operated either with the vehicle's engine on (the "run" position of the ignition), or with the vehicle's engine off (the "accy" position of the ignition) which further reduces noise. However, as will be described below, a circuit is provided to prevent battery discharge to a point that would prevent starting of the engine when running the system with the engine off, by shutting off the motors for the pumps, and illuminating the low battery indicator light 274.

Referring now to FIG. 10, the details of the controller 34 will be described. Four fuses 278,280,282,284 are disposed on the controller 34, each of which is tied to a red LED indicator light 286,288,290,292, respectively, such that if a fuse blows, the associated indicator light turns on, thereby indicating a problem condition. The fuse 278 and indicator light 286 are associated with the control circuitry for the reel retract motor 198 to thereby indicate a fault condition in the reel retract motor circuitry. Similarly, the fuse 280 and indicator light 288 are associated with the circuitry for the motor 220; the fuse 282 and the indicator light 290 are associated with the circuitry for the agitator motor 224; and the fuse 284 and indicator light 292 are associated with the circuitry for the motor 222.

The controller 34 further includes a plurality of green indicator lights to indicate the operation of each primary circuit in the system. Specifically, the control circuit for the pump motor 220 includes a green LED indicator 294 which lights when the motor 220 is sent a command to turn on, a green LED indicator 296 which lights when the motor 220 actually turns on, and a green LED indicator 298 which lights whenever the control circuit for the motor 220 is in a current-limiting mode, i.e. when not spraying. The control circuit for the motor 222 includes a green LED indicator 300 which lights when the motor 222 is sent a command to turn on, and a green LED indicator 302 which lights when the motor 222 actually turns on and where the brightness varies with the output drive voltage being supplied to the motor 222. The circuit for the agitator motor 224 includes a green LED indicator 304 which lights when the motor 224 is sent a command to turn on, and a green LED indicator 306 which lights when the motor 224 actually turns on. As will be explained below with respect to FIG. 11, the control circuit for the motor 224 is designed so as to repeatedly turn on and off the motor 224, such that the indicators 304,306 turn on and off at fixed intervals, such as every 2.5 seconds. This repeated on and off of the motor 224 improves the agitation within the tank 22. The circuit for the reel retract motor 198 includes a green LED indicator 308 which lights when the motor 198 is sent a command to turn on, and a green LED indicator 310 which lights when the motor 198 actually turns on.

A potentiometer 312 is also disposed on the controller 34 for adjusting the voltage point at which the system is shut off, thereby illuminating the low battery indicator light 274 on the pendant 36. A further potentiometer 314 on the controller 34 is provided to limit the current supplied to the pump motor 220, which sets the output pressure of the pump 58 as measured by the pressure gauge 64. For instance, the potentiometer 314 can be set to achieve 62 psi on the pressure gauge 64 when spraying, which corresponds to 33 amps being supplied to the motor 220. The controller 34 also includes a potentiometer 316 which can be used to set voltage supplied to the motor 220 for the pump 58, thereby setting the speed of the pump and the flow rate. Preferably, the potentiometer 316 is turned fully counterclockwise for normal operation.

As mentioned previously, the interlock terminal strip section 260 is provided on the controller 34. The interlocks provided by the terminal strip section 260 ensure that the controller does not receive power when it is inappropriate for the system to operate. An ignition interlock 318 applies 12V to the terminal strip and allows the controller to operate only when the ignition of the truck 12 is at the "accy" or "run" position. This interlock 318 can be bypassed by setting the power switch 276 to the INT PWR position. A transmission interlock 320 applies ground to the terminal strip and allows the controller to operate only when the truck's transmission is in park or neutral. This interlock 320 can be bypassed by installing a jumper across the terminals TRANS and GND. An IDLE RPM interlock 322 increases the truck's idle speed whenever the pump motor 220 is on, to ensure that the battery is maintained.

Figure 11:
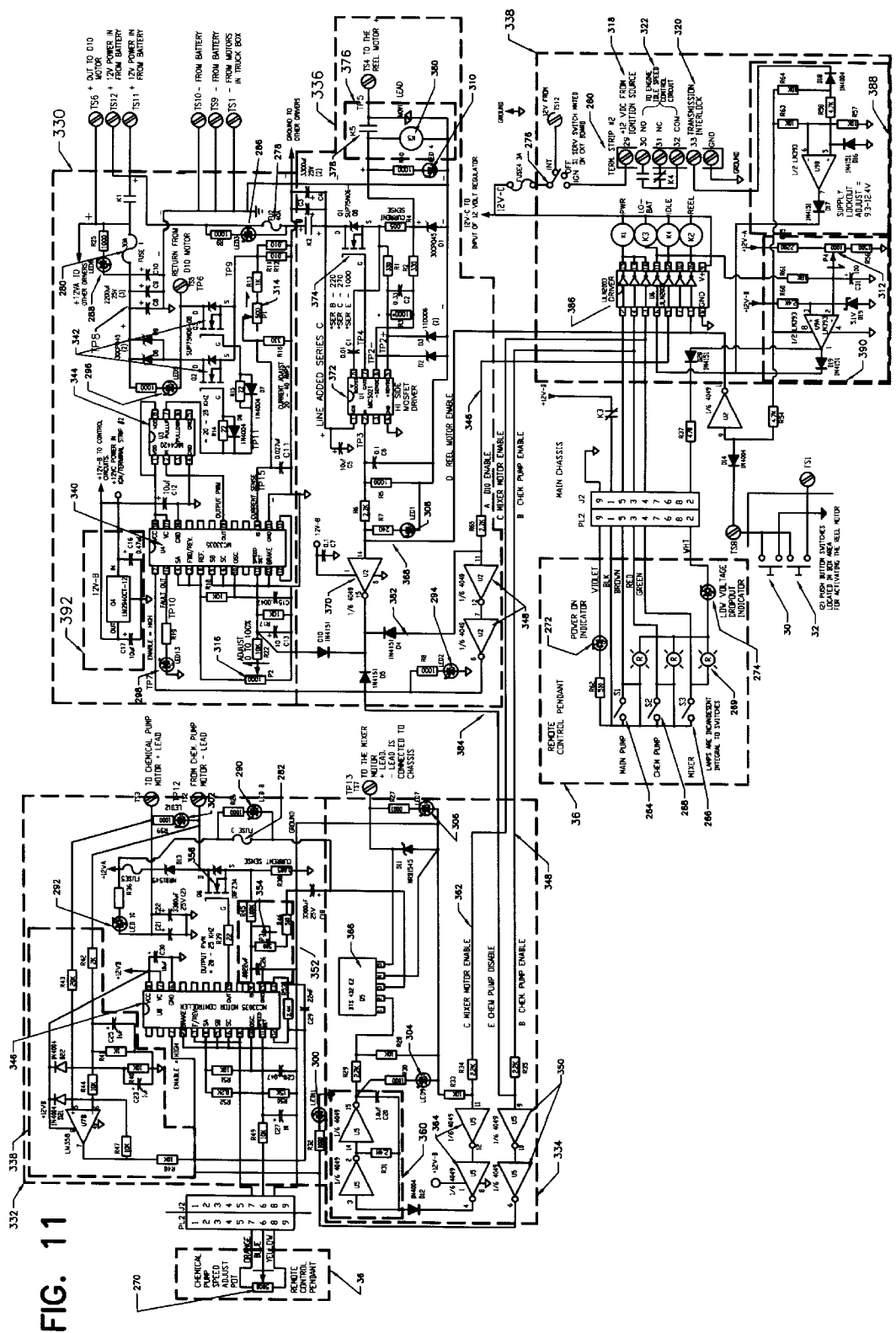
FIG. 11 illustrates the circuit diagram of the control system for controlling operation of the pump motors, reel motor and agitator motor.

Turning now to FIG. 11, the details of the control circuitry associated with the controller 34 of the present invention for controlling the operation of the motors 198,220,222,224 are illustrated in detail. The control system generally includes a circuit 330 for controlling the operation of the motor 220 for the pump 58, a circuit 332 for controlling the operation of the motor 222 for the pump 160, a circuit 334 for controlling the operation of the agitator motor 224, a circuit 336 for controlling the operation of the reel retract motor 198, and interlock circuitry 338 for controlling the operation of the interlocks 318,320,322.

The control circuit 330 for the pump motor 220 includes a conventional motor control chip 340 for controlling the operation of the motor 220, a pair of FETS 342, and an amplifier 344 for powering the two FETS 342. As mentioned previously, the potentiometer 314 is provided to adjust and select the current supplied to the motor 220, and the potentiometer 316 is set to 100% by turning fully in the counterclockwise direction. When the switch 264 on the pendant 36 is turned on, a signal is sent over pump enable line 346 through suitable gating 348 to the input of the control chip 340. The LED indicator 294, which is disposed in the enable line 346, is thus illuminated. The control chip 340 will then turn on the pump motor 220, at which point the LED indicator 296 is illuminated. The potentiometer 314 limits the current supplied to the motor 220, thereby providing torque control and thereby pump output pressure control. The LED indicator 298 illuminates whenever the motor 220 is being current limited, which is when a person is not spraying, with the brightness of the LED indicator 298 changing based upon the current limiting. As mentioned earlier, the potentiometer 314 is preferably set to achieve a predetermined pressure as measured by the pump outlet gauge 64 when spraying. During spraying, the pump motor 220 speeds up since liquid is being discharged from the spray gun 156. However, when the spray gun 156 is turned off, the pump motor 220 slows down (controlled by the current limiting of the potentiometer 314) and a higher pressure is supplied to the agitator 122 in the respective tank 18,20.

The control circuit 332 for the motor 222 also uses current limiting to limit the power supplied to the motor 222, and thereby limiting the speed. As shown in FIG. 11, the circuit 332 includes a conventional motor control chip 346 which receives a control input through enable line 348 via suitable gating 350. The switch 268 on the pendant 36 is connected to the control chip 346 via the enable line 348 to provide the "on" signal to the chip 346. The circuit 332 further includes a current limiting sub-circuit 352 for limiting the current supplied to the motor 222, with current limit control being provided by a potentiometer 354. A FET 356 provided in the circuit 332 provides filtering for the current limiting. The circuit 332 further includes a closed loop voltage feedback sub-circuit 358 to maintain the voltage at a predetermined level, which is necessary due to fluctuations in the input voltage supplied from the vehicle's electrical system.

When the switch 268 is turned on, a signal is sent by the enable line 348 to the control chip 346, and the LED indicator 300, which is disposed in the enable line 348, lights. The control chip 346 then turns on the motor 222, as indicated by the LED indicator 302, with the current that is supplied to the motor 222 being limited by the limiting sub-circuit 352. During operation, the potentiometer 270 on the pendant 36 permits the operator to adjust the voltage supplied to the motor, thereby adjusting the speed of the motor 222 and the output of the pump 160. The voltage feedback sub-circuit 358 automatically maintains a desired current level to ensure smooth operation of the motor 222, regardless of any input voltage variations from the electrical system of the vehicle.

The circuit 334 for controlling the agitator motor 224 has repeated timed on and off cycling of the agitator for improved agitation within the tank 22. Thus, the circuit 334 includes a timer on/off sub-circuit 360 for intermittently turning on and off the motor 224, for instance at about 2.5 second intervals. The circuit 334 is controlled by the switch 266 on the pendant, through an agitator enable line 362 and suitable gating 364. A FET 366 provides protection and current limiting to the motor 224.

When the switch 266 is turned on, a signal is sent to the circuit 334 through enable line 362, and the LED indicator 304 illuminates. The on/off sub-circuit 360 then supplies intermittent pulses of current to the motor 224, thus intermittently turning on and off the motor. It should be noted that the LED indicators 304 and 306 will each intermittently flash due to the pulses supplied by the sub-circuit 360.

The circuit 336 for controlling the operation of the reel retract motor 198 is controlled by either of the reel retract switches 30,32 on the module through an enable line 368 with suitable gating 370. A MOSFET driver 372 receives the signal from the switches 30,32 for turning on the motor 198 in order to rotate the reel 194 and wind the hose assembly 154. The MOSFET driver 372 includes a voltage boost pin to turn on a FET 374 in the circuit 336. The MOSFET driver 372 senses the FET current and controls it to thereby limit the current, and thus the torque, available for hose retracting, which increases operator safety. The circuit 336 further includes a freewheel sub-circuit 376 with a contact switch 378 and a relay coil 380. The freewheel sub-circuit 376 is designed to allow the reel 194 to freewheel without operating like a generator when the hose assembly 154 is being unwound.

The circuit 336 is further designed to turn off the motor 220 and the motor 222 whenever one of the reel retract switches 30,32 is pushed. As seen in FIG. 11, a disable line 382 extends from the gating 370 to the gating 348 to turn off the motor 220 when either switch 30,32 is pushed, and a disable line 384 extends from the gating 370 to the gating 350 to turn off the motor 222 when either switch 30,32 is pushed. Since the electrical power available from the vehicle's electrical power system is limited, turning off the motors 220,222 when either switch 30,32 is pushed prevents excessive current draw from the vehicle's electrical system. Further, retraction of the hose assembly indicates that spraying is completed or at least temporarily halted, and therefore continued operation of the pump motors 220,222 during hose retraction is unnecessary.

As mentioned with regard to FIG. 10, interlocks are provided to ensure that the controller 34 does not receive power when it is inappropriate for the system to operate. The interlock circuitry 338 for the interlocks 318,320,322 is shown in FIG. 11, in which an amplifier 386 is provided to power the interlocks, and with the amplifier connected to relays K1–K4. Relay K1 is a power relay, K2 is a reel assembly relay, K3 is a low battery relay, and K4 is an idle relay, the purpose of which will become apparent later in the description.

A transmission interlock comparator sub-circuit 388 is connected to the terminal strip TS33 to form the transmission interlock 320. The sub-circuit 388 determines whether the transmission of the vehicle is in either a neutral or park position, and if so, allows power to be supplied to the controller. The transmission interlock 320 is suitably connected to the transmission of the vehicle 12 to provide an indication when the transmission is in either neutral or park. A voltage comparator sub-circuit 390 is also provided which turns off power to the entire system when the voltage from the vehicle's battery/electrical system falls below a predetermined threshold value, as set by the potentiometer 312.

The ignition interlock 318 is illustrated in FIG. 11 as being connected to the IGN terminal of the switch 276 such that power is supplied to the system only when the ignition of the vehicle is in the "acey" or "run" position. Terminal TS29 of the ignition interlock 318 is suitably connected to the ignition of the vehicle so as to operate in the manner described. The IDLE RPM interlock 322 increases the truck's idle speed whenever the pump motor 220 is on, to thereby maintain battery charge. The terminals TS30–32 of the interlock 322 are suitably connected to the idle speed control circuit of the vehicle 12 to increase the idle speed when appropriate.

The INT terminal of the switch 276 is connected directly to TS12 so as to receive direct battery power, thus bypassing the interlocks 318,320,322. This allows the system to operate when the vehicle is not running, a so-called "quiet mode", with the battery comparator sub-circuit 390 preventing battery discharge below a point that would prevent starting of the engine by shutting off power to the system and flashing the low battery indicator 274 on the pendant 36.

The control system of the present invention also includes a voltage regulator sub-circuit 392 (shown as being a portion of the circuit 330). The voltage regulator sub-circuit 392 regulates the voltage supplied to each of the various circuits 330–338 by maintaining a constant voltage regardless of voltage variations from the battery/electrical system of the vehicle.

The operation of the module 10 and the control system for controlling the operation of the module will now be described. In use, the operator actuates the switch 276 on the controller 34 to select the desired power input mode. When the switch 276 is actuated to the INT position, power is supplied directly from the battery of the vehicle whether the vehicle is running or not. On the other hand, if the switch 276 is at the IGN position, power is supplied only when the ignition of the vehicle is at the "accy" or the "run" position. The switches 264–268 on the pendant can then be turned on, thereby activating the motors 220–224. As explained above, the circuits 330–334 are designed to limit the current supplied to the motors, thereby allowing this system to be used with standard automotive pickup battery/electrical systems which typically provide 12V electrical power.

The tank selection lever 26 allows the operator to select which tank 18,20 the pump 58 will pump from, with the circuit 330 limiting the current supplied to the motor 220 to thereby limit the pump output pressure. The output of the pump 58 is directed to the regulator assembly 24 which is used to regulate the spray flow rate of the spray gun 156. It is noted that in the preferred embodiment, the tanks 18,20 preferably hold different fertilizer liquids, while the tank 22 preferably holds a herbicide liquid. The tank 22 thus has its own pump 160 to pump the liquid to the spray gun 156, with the potentiometer 270 on the pendant controlling the speed of the pump motor 222 and therefore the output pressure of the pump. Thus the present invention allows dual spraying of both the fertilizer and the herbicide liquids, with the flow rates of the two fluids being independently adjusted. The unique configuration of the input and output valves 45,63 for the pump 58 additionally ensures that the liquid returned from the regulator assembly 24 is returned to the proper tank, thereby preventing mixing of the different fertilizer liquids.

When spraying is completed or when hose is to be otherwise retracted, the operator can simply push either reel retract switch 30,32 located on each side of the module to activate the reel retract motor 198. Simultaneously, the control system shuts off the motors 220,222 to prevent excessive current draw from the vehicle's battery. Thus, the control system of the present invention is specifically designed to allow the module to be powered by the vehicle's electrical system, by utilizing current limiting of the motors.

It is to be understood that while certain embodiments of the present invention have been illustrated and described, the invention is not limited to the specific forms or arrangements of parts described and shown.

We claim:

1. A lawn spray applicator system for use on a vehicle having a vehicle electrical power system, comprising:
    an applicator module removably mountable on the vehicle, said applicator module including a housing, a plurality of liquid supply tanks disposed in the housing and a liquid dispensing system disposed in the housing and connected to each of the liquid supply tanks for dispensing liquid therefrom, and said liquid dispensing system includes a first electric motor; and
    a control system electrically connected to the liquid dispensing system for providing electrical power to, and controlling operation of, the liquid dispensing system, said control system adapted to be connected to the vehicle electrical power system to supply electrical power to the control system, and said control system includes means to limit the current supplied from the vehicle electrical power system to the first electric motor.

2. The lawn spray applicator system according to claim 1, wherein said liquid dispensing system includes a first pump connected to two of said liquid supply tanks, and a second pump connected to a third said liquid supply tank.

3. The lawn spray applicator system according to claim 2, further including means for selectively connecting said first pump to a single one of said two liquid supply tanks.

4. The lawn spray applicator system according to claim 2, wherein said control system includes means to regulate an output pressure of the first pump.

5. The lawn spray applicator system according to claim 2, wherein said liquid dispensing system includes a spray gun connected to an output of said first pump, and further including means for regulating a spray flow rate of a liquid discharged from the first pump.

6. The lawn spray applicator system according to claim 2, wherein said liquid dispensing system includes a spray gun connected to an output of said second pump, and said control system includes means to regulate a spray flow rate of liquid discharged from the second pump.

7. The lawn spray applicator system according to claim 1, wherein the liquid dispensing system includes at least one additional electric motor, and said control system includes means to limit the current supplied from the vehicle electrical power system to the at least one additional electric motor.

8. The lawn spray applicator system according to claim 7, wherein one of said liquid supply tanks includes a motor driven agitator, and said control system is connected to said motor driven agitator to control the operation thereof.

9. The lawn spray applicator system according to claim 8, wherein said control system includes means to limit the current supplied from the vehicle electrical power system to the motor driven agitator.

10. The lawn spray applicator system according to claim 1, wherein said control system comprises:
    a controller adapted to be electrically connected to the applicator module for providing electrical power thereto and controlling the operation thereof, and said controller being adapted to be electrically connected to the vehicle electrical power system to supply electrical power to the controller; and
    a control pendant electrically connected to the controller for providing control inputs thereto in order to control operation of the applicator module.

11. The lawn spray applicator system according to claim 10, further including a power switch for controlling electrical power to the controller.

12. The lawn spray applicator system according to claim 11, wherein the vehicle includes a vehicle ignition, and the controller includes an ignition interlock to control current flow to the controller based upon the position of the vehicle ignition.

13. The lawn spray applicator system according to claim 12, wherein the power switch includes a first setting to activate the ignition interlock and a second setting to bypass the ignition interlock.

14. The lawn spray applicator system according to claim 10, wherein the first electric motor drives a pump, and said controller includes a first control circuit for controlling operation of the first electric motor.

15. The lawn spray applicator system according to claim 14, wherein said first control circuit includes current limiting circuitry for limiting current to the first electric motor.

16. The lawn spray applicator system according to claim 15, wherein said current limiting circuitry includes a potentiometer to adjust the current to the first electric motor.

17. The lawn spray applicator system according to claim 14, wherein said control pendant includes a switch to turn the first electric motor on and off.

18. The lawn spray applicator system according to claim 14, wherein said first control circuit includes indicators to indicate the operation thereof.

19. The lawn spray applicator system according to claim 14, wherein the applicator module includes a second electric motor driving a pump, and said controller includes a second control circuit for controlling operation of the second electric motor.

20. The lawn spray applicator system according to claim 19, wherein said second control circuit includes a current limiting sub-circuit to limit current to the second electric motor.

21. The lawn spray applicator system according to claim 20, wherein said control pendant includes a switch thereon to turn the second electric motor on and off.

22. The lawn spray applicator system according to claim 20, wherein said control pendant includes a potentiometer connected to the second control circuit to control the voltage to the second electric motor.

23. The lawn spray applicator system according to claim 19, wherein said second control circuit includes a closed-loop voltage feedback sub-circuit which maintains a predetermined voltage level supplied to the second electric motor.

24. The lawn spray applicator system according to claim 19, wherein said second control circuit includes indicators to indicate the operation thereof.

25. The lawn spray applicator system according to claim 19, wherein the module includes a third electric motor which drives a hose reel assembly, and said controller includes a third control circuit for controlling operation of the third electric motor.

26. The lawn spray applicator system according to claim 25, wherein said third control circuit includes current limiting circuitry for limiting current to the third electric motor.

27. The lawn spray applicator system according to claim 25, further including at least one switch to turn the third electric motor on and off.

28. The lawn spray applicator system according to claim 27, wherein there is a pair of said switches, said pair of switches being mounted on the applicator module.

29. The lawn spray applicator system according to claim 27, wherein the third control circuit is connected to each of the first and second control circuits in a manner such that when the switch turns the third electric motor on, the first and second electric motors are turned off.

30. The lawn spray applicator system according to claim 25, wherein said third control circuit includes a freewheel sub-circuit to allow the hose reel assembly to freewheel.

31. The lawn spray applicator system according to claim 25, wherein said third control circuit includes indicators to indicate the operation thereof.

32. The lawn spray applicator system according to claim 25, wherein the applicator module further includes a fourth electric motor driving an agitator, and said controller includes a fourth control circuit for controlling operation of the fourth electric motor.

33. The lawn spray applicator system according to claim 32, wherein the fourth control circuit includes current limiting circuitry to limit current to the fourth electric motor.

34. The lawn spray applicator system according to claim 32, wherein the fourth control circuit includes a timer on/off sub-circuit for intermittently turning on and off the fourth electric motor.

35. The lawn spray applicator system according to claim 32, wherein said control pendant includes a switch to turn the fourth electric motor on and off.

36. The lawn spray applicator system according to claim 32, wherein said fourth control circuit includes indicators to indicate the operation thereof.

37. The lawn spray applicator system according to claim 10, wherein the controller includes a transmission interlock.

38. The lawn spray applicator system according to claim 10, wherein the controller includes an idle speed interlock.

39. The lawn spray applicator system according to claim 10, wherein the controller includes a voltage comparator sub-circuit which interrupts power to the controller when the voltage available from the vehicle electrical power system falls below a predetermined point.

40. The lawn spray applicator system according to claim 10, wherein the controller includes a voltage regulator sub-circuit for maintaining a constant voltage.

41. A lawn spray applicator module for use with a vehicle having a vehicle box, comprising:

a housing adapted to be removably disposed within the vehicle box, said housing defining an interior space;

a plurality of liquid supply tanks mounted within the interior space of the housing; and a liquid dispensing system disposed within the housing and connected to each of the liquid supply tanks for dispensing liquid therefrom onto a lawn, wherein said liquid dispensing system includes a first pump connected to two of said liquid supply tanks, and a second pump connected to a third said liquid supply tank, further including a dual line hose assembly, said dual line hose assembly including a first line in communication with said first pump and a second line in communication with said second pump;

a first actuatable valve for selectively connecting said first pump to a single one of said two liquid supply tanks; and a pressure regulator assembly connected to a discharge of said first pump, wherein said pressure regulator assembly includes a pair of inlet ports, and further comprising a second actuatable valve to selectively direct the discharge of the pump to one of the inlet ports.

42. The lawn spray applicator module according to claim 41, further including a lever connected to each of the first and second valves whereby said lever simultaneously actuates each of said first and second valves.

43. The lawn spray applicator module according to claim 41, wherein said pressure regulator assembly further includes an outlet port associated with each said inlet port, each said outlet port communicating with a respective one of said two liquid supply tanks, and a check valve assembly controlling flow from each of the inlet ports to the associated said outlet port.

44. The lawn spray applicator module according to claim 43, wherein said pressure regulator assembly includes an additional outlet port in selective communication with said inlet ports, and an actuatable, pressure adjusting valve controlling pressure from the inlet ports to the additional outlet port.

45. The lawn spray applicator module according to claim 44, further including an adjusting mechanism for adjusting the pressure adjusting valve, thereby adjusting the pressure to the additional outlet port.

46. The lawn spray applicator module according to claim 41, further including an air-purge valve assembly associated with each of said two liquid supply tanks, each said air-purge valve assembly being manually actuatable.

47. The lawn spray applicator module according to claim 41, further including an automatic air bleed assembly associated with said third liquid supply tank.

48. The lawn spray applicator module according to claim 41, further including a hose reel assembly disposed in the interior space of said applicator module, said hose reel assembly being connected to a discharge of each of said first and second pumps.

49. The lawn spray applicator module according to claim 48, wherein said hose reel assembly includes an electric motor to drive the hose reel assembly.

50. The lawn spray applicator module according to claim 49, further including a pair of switches for controlling the electric motor.

51. The lawn spray applicator module according to claim 41, further including a door to control access to the interior space of the housing.

52. The lawn spray applicator module according to claim 51, wherein the door comprises a pair of gull wing door members pivotally mounted to the housing.

53. A lawn spray applicator module for use with a vehicle having a vehicle box, comprising:
- a housing adapted to be removably disposed within the vehicle box said housing defining an interior space;
- a plurality of liquid supply tanks mounted within the interior space of the housing;
- a liquid dispensing system disposed within the housing and connected to each of the liquid supply tanks for dispensing liquid therefrom onto a lawn, wherein said liquid dispensing system includes a first pump connected to two of said liquid supply tanks, and a second pump connected to a third said liquid supply tank, further including a dual line hose assembly, said dual line hose assembly including a first line in communication with said first pump and a second line in communication with said second pump; and
- an automatic air bleed assembly associated with said third liquid supply tank, wherein said automatic air bleed assembly includes a housing having an inlet end connected to a discharge of said second pump and an outlet end connected to said third liquid supply tank, a sleeve disposed in the housing, and a flow control ball moveably disposed in the sleeve for controlling flow from the inlet end to the outlet end.

54. The lawn spray applicator module according to claim 53, wherein the sleeve has an inner diameter, and said flow control ball has a diameter less than the inner diameter of the sleeve whereby fluid can flow past the ball.

55. The lawn spray applicator module according to claim 53, wherein said flow control ball has a weight sufficient to prevent movement thereof within the sleeve until the second pump discharges liquid that is relatively free of air.

56. A lawn spray applicator module for use with a vehicle having a vehicle box, comprising:
- a housing adapted to be removably disposed within the vehicle box, said housing defining an interior space;
- a plurality of liquid supply tanks mounted within the interior space of the housing;
- a liquid dispensing system disposed within the housing and connected to each of the liquid supply tanks for dispensing liquid therefrom onto a lawn, wherein said liquid dispensing system includes a first pump connected to two of said liquid supply tanks, and a second pump connected to a third said liquid supply tank, further including a dual line hose assembly, said dual line hose assembly including a first line in communication with said first pump and a second line in communication with said second pump; and
- a hose reel assembly disposed in the interior space of said applicator module, said hose reel assembly being connected to a discharge of each of said first and second pumps, and
- wherein the hose reel assembly includes a pair of slideable extension arms thereon, said extension arms being parallel to, and spaced from, each other, with a first set of guide rollers at a first end of the extension arms and a second set of guide rollers at a second end of the extension arms.

57. The lawn spray applicator module according to claim 56, wherein said extension arms are slideable between a first position where the first set of guide rollers are disposed adjacent a first side of the housing, and a second position where the second set of guide rollers are disposed adjacent a second side of the housing.

* * * * *